Patented Oct. 8, 1929

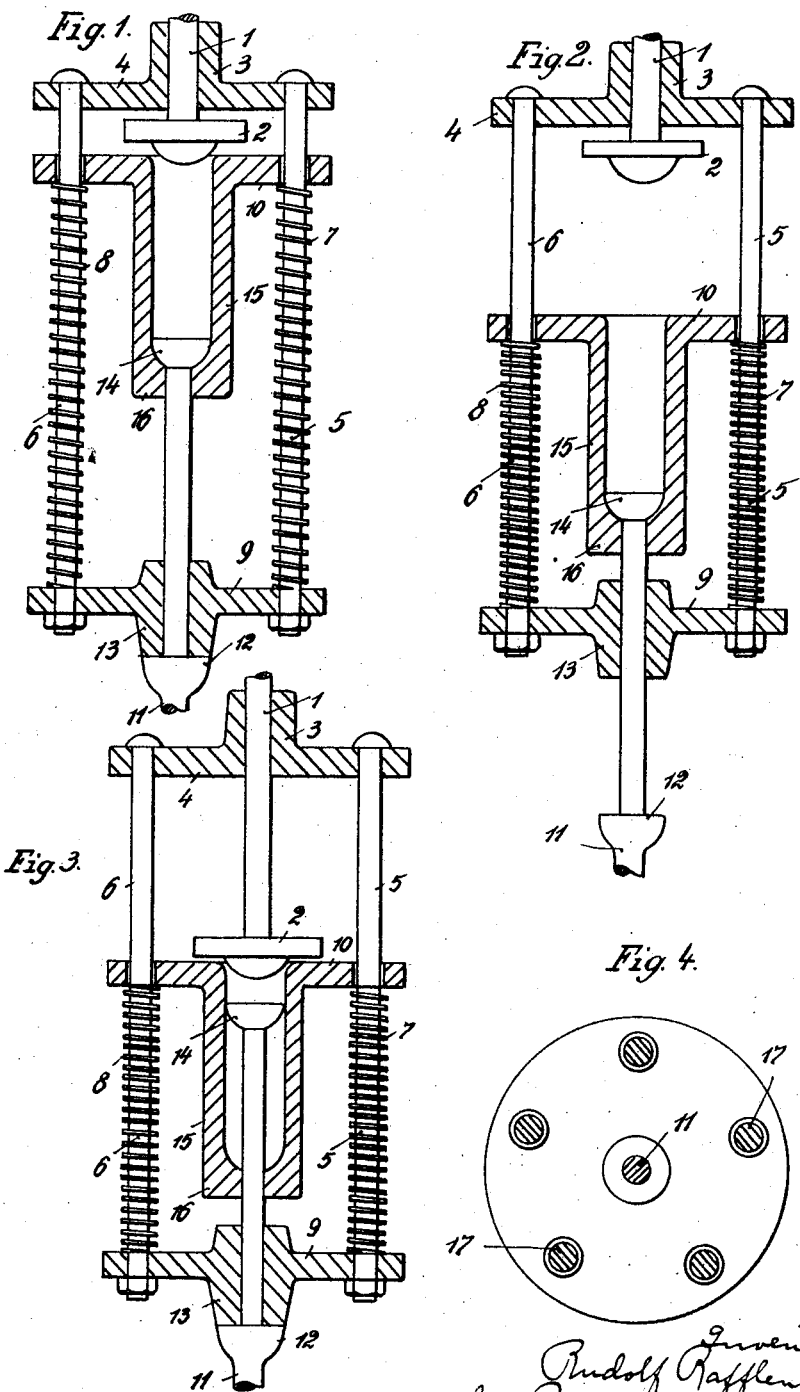

1,731,149

UNITED STATES PATENT OFFICE

RUDOLF RAFFLENBEUL, OF VORHALLE, NEAR HAGEN, GERMANY

SHOCK ABSORBER FOR VEHICLE COUPLINGS

Application filed April 2, 1928, Serial No. 266,765, and in Germany February 28, 1927.

This invention relates to a spring mounted shock absorber which is particularly suitable for coupling up tram or commercial transport vehicle trailers or other vehicles not provided with buffers.

Hitherto, shock absorbers in vehicle couplings have usually been constructed so that they only take up either the propulsive force operative in the coupling rod, or the tensional force, i. e., could only absorb the shock either on stopping or on starting. The invention relates to a device which allows of the transmission of both the tensional forces, and also the compressional forces set up in the coupling rod to springs which are stressed in the same way in both cases, which considerably simplifies and cheapens the manufacture of the known shock absorbers, as the introduction of different springs for absorbing the forces acting in the coupling in opposite directions on accelerating and retarding the movement, is rendered unnecessary.

This is attained according to the invention by providing an improved spring-mounted shock absorber for vehicle couplings which consists of a yoked frame, each end of the split coupling rod being guided in the end cross members thereof, whilst a further cross member is displaceable on the side members of the yoke.

One end of the coupling rod, secured against removal in its guide member, is coupled with this displaceable cross member in compression, whilst the other end of the coupling rod, secured against forward movement in its guide member, is coupled in tension.

As a result the central cross member acted on alternately by the ends of the coupling rod, is always displaced in the side members of the yoke in the same direction both when the shock absorber is subjected to compressional strain, and also tension, and therefore acts in the same sense on the springs arranged on the side members of the yoke, between the cross members, although the forces set up in the coupling rod act in opposite directions.

The springs are preferably helical springs arranged on the side members of the yoke, which are constructed as compression springs and are arranged between the movable intermediate cross member and the cross member in which the end of the coupling rod secured against forward movement is guided. The end cross members in which the ends of the coupling rod are guided may be rigidly or movably mounted on the side of the yoke.

In order to render it unnecessary to increase the structural length of the shock absorber adapted to absorb more powerful forces by utilizing long helical springs, the cross members may according to the invention be made in the form of discs and a plurality of connecting rods carrying springs may be arranged in a circle.

A spring mounted shock absorber which may for example be constructed in the coupling rod suspended in the usual manner below the platform of trams is shown in the accompanying drawings as a form of construction of the invention.

Figure 1 shows a shock absorber in section when out of tension.

Figure 2 shows the same shock absorber when subjected to tension, and

Figure 3 when subjected to compressional strain.

Figure 4 is a diagrammatic side elevation in section showing a shock absorber arranged for five springs.

Two portions 1 and 11 of the coupling rod are guided in bushes 3 and 13 respectively, these bushes being cast on end cross members 4 and 9 connected by two rods 5 and 6. The end 1 of the coupling rod is secured against withdrawal from the shock absorber when this is under tension by a flange 2 formed on said rod (Figure 2) whilst the other end 11 of the coupling rod bears against the guide bush 13 of the member 9, by means of a flange 12 when the coupling rod is subjected to compression (Figure 3).

An intermediate cross member 10, against which the face of the flange 2 of the coupling rod 1 acts on compression of the coupling (Figure 3) is displaceable on the side members 5 and 6 of the yoke. When the coupling is in tension (Figure 2) the intermediate cross member 10 is drawn along by means of an enlarged end 14 of the coupling rod 11, in the same direction as on compressional strain.

The face of the widened end 2 of the coupling rod 1 bearing against the intermediate cross member 10 is preferably spherically curved, in order to allow suitable contact with the member 10 in every case. The head 14 of the other coupling rod 11 which is guided on the application of compressional strain in a tubular portion 15 of the cross member 10, is also spherical in shape, so that it can rest in the dished end 16 of the tubular bush 15 with a suitable bearing surface on the application of tensional strain.

Helical compression springs 7 and 8 are arranged on the connecting rods or members 5 and 6 between the cross members 9 and 10. The compression and tension set up alternately in the coupling rod on accelerating and also reducing the velocity with which the vehicle is travelling, cause the intermediate cross member 10 in both cases to move up to the end cross member 9, so that the springs inserted between these cross members are subjected to compression in each case and therefore take up the tensional and also the compressional forces.

Instead of inserting compression springs between the cross members 9 and 10, as in the example shown, tension springs may of course be inserted between the members 4 and 10, and also tension and compression springs between the three cross members. The end cross members 4 and 9 may also slide on the connecting members 5 and 6, similarly to the intermediate member 10.

If only one spring is used, it is preferably mounted as a compression spring on the tubular bushing 15 and the end of the coupling rod 11, between the cross members 1 and 10.

In order to facilitate the use of a large number of springs without increasing the structural length the cross members are made in the form of discs as shown in Figure 4 and a plurality of connecting rods 17 carrying springs are arranged in a circle.

I claim:

1. A shock absorber for vehicle couplings consisting of a split coupling rod, a yoke comprising end cross members and side members connecting together said end cross members, an intermediate cross member displaceable longitudinally on said side members, springs on said yoke and means to connect the adjacent ends of said split coupling rod with said intermediate member whereby said intermediate cross member is displaced relative to said end cross members on the application of a compressive or tensional stress on the shock absorber.

2. A shock absorber for vehicle couplings consisting of a split coupling rod, a yoke comprising end cross members and longitudinal guide members adapted to connect together said end cross members, an intermediate cross member displaceable along said longitudinal guide members and having a tubular portion extending longitudinally of said yoke, springs on said yoke, enlarged ends on the adjacent ends of the split coupling rod, the enlarged end of one portion of the coupling rod engaging one face of the intermediate member to displace this longitudinally of the yoke against the action of the springs on the application of a compressive force whilst the enlarged end of the opposite portion of the split coupling rod engages within the tubular portion of the intermediate member to similarly displace said intermediate member relatively to said end members on the application of a tensional force on the shock absorber.

3. A shock absorber for vehicle couplings consisting of a split coupling rod, a yoke comprising end cross members and side members connecting together said end cross members, an intermediate cross member displaceable longitudinally on said side members, helical compression springs on said longitudinal guide members and means to connect the adjacent ends of said split coupling rod with said intermediate member whereby said intermediate cross member is displaced relative to said end cross members on the application of a compressive or tensional stress on the shock absorber.

4. A shock absorber for vehicle couplings consisting of a split coupling rod, a yoke comprising end cross members and longitudinal guide members adapted to connect together said end cross members, an intermediate cross member displaceable along said longitudinal guide members and having a tubular portion extending longitudinally of said yoke, a helical spring surrounding the tubular portion of said intermediate cross member, enlarged ends on the adjacent ends of the split coupling rod, the enlarged end of one portion of the coupling rod engaging one face of the intermediate member to displace this longitudinally of the yoke against the action of the springs on the application of a compressive force whilst the enlarged end of the opposite portion of the split coupling rod engages within the tubular portion of the intermediate member to similarly displace said intermediate member relatively to said end members on the application of a tensional force on the shock absorber.

5. A spring mounted shock absorber for vehicle couplings consisting of yoke comprising a pair of disc elements at the ends of said yoke and a plurality of longitudinal connecting rods between said disc members, a bush on each disc member, a split coupling rod, the end of one portion of which engages within the bush of one disc and the adjacent end of the other portion of which engages in the bush of the other disc, enlarged ends to said portions of said split coupling rod, an intermediate member adapted for relative rotation with said disc and guided in its displacement along said connecting rods, a longitudinal tubular portion on said intermediate member and springs on said yoke, the intermediate cross member being displaced relatively to said end discs to compress said springs irrespective of the application of a tensional or compressive stress on said coupling rod.

6. A spring mounted shock absorber for vehicle couplings consisting of a yoke comprising a pair of disc elements at the ends of said yoke and a plurality of longitudinal connecting rods between said disc members, a bush on each disc member, a split coupling rod, the end of one portion of which engages within the bush of one disc and the adjacent end of the other portion of which engages in the bush of the other disc, enlarged ends to said portions of said split coupling rod, an intermediate member adapted for relative rotation with said discs and guided in its displacement along said connecting rods, a longitudinal tubular portion on said intermediate member, the enlarged end of one portion of said coupling rod displacing said intermediate member relatively to said end discs on the application of a compressive stress on said coupling rod whilst the enlarged end of the opposite portion of said split coupling rod engages within the tubular portion of said intermediate cross member to similarly displace said intermediate cross member relative to said end discs on the application of a tensional stress on said split coupling rod.

7. A spring mounted shock absorber for vehicle couplings consisting of a yoke comprising a pair of disc elements at the ends of said yoke and a plurality of longitudinal connecting rods between said disc members, arranged equidistantly around said disc members and substantially adjacent the periphery thereof, a bush on each disc member, a split coupling rod, the end of one portion of which engages within the bush of one disc and the adjacent end of the other portion of which engages in the bush of the other disc, enlarged ends to said portions of said split coupling rod, an intermediate member adapted for relative rotation with said discs and guided in its displacement along said connecting rods, a longitudinal tubular portion on said intermediate member and springs on said yoke, the intermediate cross member being displaced relatively to said end discs to compress said springs irrespective of the application of a tensional or compressive stress on said coupling rod.

In testimony whereof, I have signed my name to this specification at Berlin this 16th day of March, 1928.

RUDOLF RAFFLENBEUL.